US008261759B2

(12) United States Patent
Kelle et al.

(10) Patent No.: US 8,261,759 B2
(45) Date of Patent: Sep. 11, 2012

(54) CLEANING APPARATUS WITH FASTENING DEVICE

(75) Inventors: Stefan Kelle, Heidelberg (DE); Ralph Seitter, Backnang (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 97 days.

(21) Appl. No.: 12/802,138

(22) Filed: May 27, 2010

(65) Prior Publication Data

US 2010/0299853 A1 Dec. 2, 2010

Related U.S. Application Data

(63) Continuation of application No. PCT/EP2008/010437, filed on Dec. 9, 2008.

(30) Foreign Application Priority Data

Dec. 12, 2007 (DE) ........................ 10 2007 061 403

(51) Int. Cl.

| | |
|---|---|
| ***B08B 3/00*** | (2006.01) |
| ***B08B 3/12*** | (2006.01) |
| ***B08B 6/00*** | (2006.01) |
| ***B65D 63/00*** | (2006.01) |
| ***A47B 97/00*** | (2006.01) |
| ***F16M 13/00*** | (2006.01) |

(52) U.S. Cl. ........ 134/198; 134/201; 248/499; 248/500; 248/501; 248/502; 248/503; 248/503.1; 248/504; 248/505; 248/506; 248/507; 248/508; 248/509; 248/548; 248/549

(58) Field of Classification Search .................. 134/198, 134/201; 248/499–509, 548, 549

See application file for complete search history.

(56) References Cited

U.S. PATENT DOCUMENTS 3,582,032 A * 6/1971 Placek .......................... 248/548
3,912,404 A * 10/1975 Katt .................................. 403/2
(Continued)

FOREIGN PATENT DOCUMENTS

DE 196 01 485 7/1997
(Continued)

OTHER PUBLICATIONS

Extract from catalog of Alfred Kaercher GmbH & Co. KG, "Catalogue 2001/2002", cover, pp. 20, 21, 87 and last page (Jun. 2001).

(Continued)

*Primary Examiner* — Michael Barr
*Assistant Examiner* — Charles W Kling
(74) *Attorney, Agent, or Firm* — Lipsitz & McAllister, LLC

(57) ABSTRACT

A cleaning apparatus, in particular a high-pressure cleaning apparatus, is provided, on which at least one fastening device for fastening the cleaning apparatus to a carrier is disposed. The at least one fastening device comprising at least one tensioning section on which a tensile force, which is directed at the carrier, acts when the cleaning apparatus is fastened to the carrier by means of a tensioning element. At least one retaining section is connected to the at least one tensioning section, for retaining the at least one fastening device on the cleaning apparatus. The at least one fastening device has at least one support section in order to be supported on the cleaning apparatus. The support section is connected to the at least one tensioning section by at least one connecting section, the at least one connecting section yielding if the tensile force exceeds a maximum permissible tensile force.

30 Claims, 5 Drawing Sheets

U.S. PATENT DOCUMENTS

| | | | | |
|---|---|---|---|---|
| 4,171,803 | A * | 10/1979 | Smith | 482/83 |
| 4,759,094 | A | 7/1988 | Palmer et al. | |
| 5,369,838 | A * | 12/1994 | Wood et al. | 15/320 |
| D369,446 | S | 4/1996 | Smith | |
| D370,320 | S | 5/1996 | Hachtmann | |
| 5,553,345 | A * | 9/1996 | Bell | 15/209.1 |
| D405,569 | S | 2/1999 | Rowley et al. | |
| 5,890,258 | A | 4/1999 | Lee | |
| D417,045 | S | 11/1999 | Dziersk et al. | |
| 6,092,768 | A | 7/2000 | Larson et al. | |
| 7,004,439 | B1 * | 2/2006 | Taylor et al. | 248/548 |
| 7,059,004 | B2 | 6/2006 | Mitchell et al. | |
| D536,846 | S | 2/2007 | Pedlar | |
| D544,659 | S | 6/2007 | Auerswald et al. | |
| D549,405 | S | 8/2007 | Dammkoehler et al. | |
| D562,511 | S | 2/2008 | Medema et al. | |
| D571,512 | S * | 6/2008 | Dammkoehler et al. | D32/15 |
| D585,609 | S * | 1/2009 | Dammkoehler et al. | D32/25 |
| 2002/0073494 | A1 | 6/2002 | Stuchlik | |
| 2003/0070249 | A1 | 4/2003 | Lehman et al. | |
| 2003/0070252 | A1 | 4/2003 | Pedlar et al. | |
| 2006/0236494 | A1 | 10/2006 | Nelson et al. | |
| 2010/0078050 | A1 | 4/2010 | Bauer et al. | |

FOREIGN PATENT DOCUMENTS

| | | |
|---|---|---|
| DE | 102 55 388 | 6/2004 |
| DE | 10 2005 007 208 | 8/2006 |
| DE | 10 2007 018 248 | 10/2008 |
| DE | 10 2007 018 249 | 10/2008 |
| EP | 0 890 394 | 1/1999 |

OTHER PUBLICATIONS

Extract from catalog of Alfred Kaercher GmbH & Co. KG, “Programme 2002”, cover, pp. 38, 48, 50, 52, 53, 58 and last page (Feb. 2002).

Extract from catalog of Alfred Kaercher GmbH & Co. KG, “Programme 2003”, cover, pp. 12, 46, 52, 53, 56, 58, 60, 61, 66 and last page (Dec. 2002).

Extract from catalog of Alfred Kaercher GmbH & Co. KG, “Programme 2004”, cover, pp. 16, 78, 79, 80, 81, 82, 83, 85, 92 and last page (Feb. 2004).

Extract from catalog of Alfred Kaercher GmbH & Co. KG, “Programme 2005”, cover, pp. 14, 75, 78, 79, 80, 81, 82, 83, 85 and last page (Dec. 2004).

Extract from catalog of Alfred Kaercher GmbH & Co. KG, “Programme 2006”, cover, pp. 86, 87, 88, 89, 90, 91, 93 and last page (Dec. 2005).

http://www.karchercomercial.com/images/productseries/hw_com.jpg Dec. 14, 2007.

http://www.karchercomercial.com/images/productseries/hds_classic_hw_1.jpg Dec. 14, 2007.

http://www.karchercomercial.com/images/productseries/hds_full_size_sm.jpg Dec. 14, 2007.

Homepage and “Swipper der Müllsauger Details” of David P. Stummer, www.swipper.at (3 pages), printed Dec. 1, 2006 and Sep. 22, 2006, © 2003.

Homepage and “Glutton” product photo of Albrecht Bertsche, www.berkom.com (3 pages), printed Dec. 1, 2006.

* cited by examiner

CLEANING APPARATUS WITH FASTENING DEVICE

This application is a continuation of international application number PCT/EP2008/010437 filed on Dec. 9, 2008 and claims the benefit of German patent application no. 10 2007 061 403.0 filed on Dec. 12, 2007.

The present disclosure relates to the subject matter disclosed in international application PCT/EP2008/010437 of Dec. 9, 2008 and in German patent application 10 2007 061 403.0 of Dec. 12, 2007, which is incorporated herein by reference in its entirety and for all purposes.

BACKGROUND OF THE INVENTION

The invention relates to a cleaning apparatus, in particular a high-pressure cleaning apparatus, on which at least one fastening device for fastening the cleaning apparatus to a carrier is disposed, with the at least one fastening device comprising at least one tensioning section on which a tensile force, which is directed at the carrier, acts when the cleaning apparatus is fastened to the carrier by means of a tensioning element, and also comprising at least one retaining section, which is connected to the at least one tensioning section, for retaining the at least one fastening device on the cleaning apparatus.

The tensioning element, which may be, for example, a tensioning belt or a tensioning chain, can be used to fasten the cleaning apparatus to a carrier, for example a platform, such as the loading area of a motor vehicle. When the cleaning apparatus is fastened, a tensile force acts on the at least one tensioning section, it being possible for said tensile force to be transmitted to the cleaning apparatus by means of the at least one retaining section which can be indirectly or directly connected to the at least one tensioning section. In the process, there is a risk of the cleaning apparatus being damaged by an excessive tensile force for which it is not designed. Furthermore, a possible risk to people and the environment may be present, particularly when the at least one fastening device is retained in a region of the cleaning apparatus in which a liquid container, for example for cleaning chemicals and/or for a fuel for operating the cleaning apparatus, is integrated. An excessive tensile force may lead to the liquid container springing a leak and the liquid contained therein flowing out.

It is an object of the present invention to develop a cleaning apparatus of the type mentioned in the introduction such that the risk of damage to the cleaning apparatus due to excessive tensile force can be reduced.

SUMMARY OF THE INVENTION

In the case of a cleaning apparatus of this generic type, this object can be achieved, according to the invention, in that the at least one fastening device has at least one support section in order to be supported on the cleaning apparatus, said support section being connected to the at least one tensioning section by means of at least one connecting section, with the at least one connecting section yielding if the tensile force exceeds a maximum permissible tensile force.

The at least one fastening device can be supported on the cleaning apparatus by means of the at least one support section. This can be done in such a way that, in the intact state of the at least one fastening device, that is to say as long as the at least one connecting section has not yielded, a tensile force which acts on the at least one tensioning section is transmitted to the cleaning apparatus by means of the at least one support section, but not by means of the at least one retaining section.

If a tensile force which is greater than the maximum permissible tensile force acts on the at least one tensioning section, the at least one connecting section yields. The excessive tensile force therefore has an adverse effect on the at least one connecting section, so that the risk of damage to the cleaning apparatus on account of the excessive tensile force can be reduced.

The at least one support section can be indirectly or directly connected to the at least one tensioning section by means of the at least one connecting section.

Provision may be made for the at least one connecting section to irreversibly yield only once when the tensile force exceeds the maximum permissible tensile force. In this way, it is possible to retrospectively determine, for example following transportation of the cleaning apparatus with a motor vehicle, whether the cleaning apparatus has been subjected to excessive tensile force loads during transportation.

Provision may also be made for the at least one connecting section to yield several times and in particular to be able to yield reversibly when the tensile force exceeds the maximum permissible tensile force. In this way, the at least one fastening device can continue to be supported on the cleaning apparatus even when the tensile force exceeds the maximum permissible tensile force several times.

It is advantageous when the at least one retaining section can ensure that the at least one fastening device is retained on the cleaning apparatus when the tensile force exceeds the maximum permissible tensile force. When the maximum permissible tensile force is exceeded for the first time, the at least one connecting section yields. Nevertheless, the cleaning apparatus remains fastened to the carrier because the at least one retaining section can be used to ensure that the at least one fastening device is retained on the cleaning apparatus.

It has proven advantageous when the at least one retaining section is disposed on a side of the at least one fastening device which is averted from the at least one tensioning section, and when the at least one connecting section and the at least one support section are at a smaller spacing from the at least one tensioning section than the at least one retaining section. As a result, it is possible to ensure, in a structurally simple manner, that a tensile force which acts on the at least one tensioning section first acts on the cleaning apparatus by means of the at least one support section, whereas the at least one retaining section is not subjected to loading as long as the at least one connecting section has not yielded.

The at least one retaining section can preferably be deformed, at least in certain regions. This provides the option of deforming the at least one fastening device in certain regions. This can be done, for example, in such a way that the tensile force exceeds the maximum permissible tensile force with the at least one connecting section yielding, but a connection between the at least one fastening device and the cleaning apparatus can nevertheless be maintained with the at least one retaining section deforming.

Provision may also be made for the region or regions of the cleaning apparatus on which the at least one retaining section is retained to be deformable.

It is advantageous when the at least one connecting section forms a predetermined breaking section. If the tensile force exceeds the maximum permissible tensile force, the at least one connecting section can rupture at least in certain regions and preferably completely, so that tensile force can no longer be transmitted to the cleaning apparatus by means of the at least one support section. The design of the at least one connecting section as a predetermined breaking section is structurally simple and has proven reliable in practice.

In another type of embodiment of the cleaning apparatus according to the invention, it is advantageous when the at least one connecting section forms a deformation section. This provides the option that the at least one connecting section is deformed at least in certain regions, and preferably completely, by the tensile force which exceeds the maximum permissible tensile force. In particular, provision may be made for the deformation to be reversible, so that the at least one connecting section can yield several times when the tensile force exceeds the maximum permissible tensile force.

The at least one connecting section is preferably formed, at least in certain regions, using a material which can be deformed by means of a lesser force than the material which is used to form the at least one tensioning section and/or the at least one support section. This embodiment provides, in a technically simple manner, the option that the at least one connecting section forms a deformation section, as described above.

The at least one connecting section can be formed in a structurally simple manner so as to yield when the at least one connecting section forms a material recess, at least in certain regions. This has proven advantageous particularly when the at least one connecting section is in the form of a predetermined breaking section.

It has been found to be particularly reliable for yielding of the at least one connecting section when the material recess is in the form of a groove and/or in the form of a perforation.

It is advantageous when the at least one connecting section is disposed on a rim of the at least one support section, the at least one support section being connected to the rest of the at least one fastening device by means of said rim. This allows the at least one connecting section to be formed in a structurally simple manner in a defined position. It can be disposed, for example, in the form of a groove-like material recess at a rim of the at least one support section and form a predetermined breaking section. The at least one connecting section advantageously runs along the entire rim of the at least one support section, by means of which rim said support section is connected to the rest of the at least one fastening device in order to define a predetermined breaking line.

The at least one support section preferably has a support member, which interacts with a corresponding support member of the cleaning apparatus on the tensile force side, in order to transmit the tensile force from the at least one fastening device to the cleaning apparatus. In the present case, "on the tensile force side" means that the support member of the at least one support section has a side which faces the direction of the tensile force and with which said support member interacts with the support member of the cleaning apparatus. The at least one fastening device can be supported on the cleaning apparatus by means of the interacting support members, and therefore the tensile force which acts on the at least one tensioning section can be transmitted to the cleaning apparatus.

The support member of the at least one support section and/or the support member of the cleaning apparatus are advantageously in the form of abutment faces which bear against one another. As a result, the tensile force can be effectively transmitted in a structurally simple manner from the at least one fastening device to the cleaning apparatus, in particular if the two support members are in the form of abutment faces.

The at least one support section preferably has an abutment member which interacts with a corresponding abutment member of the cleaning apparatus counter to the tensile force. In the present case, "counter to the tensile force" is to be regarded as meaning opposite to the above-described "tensile force side". The at least one support section can bear against the abutment member of the cleaning apparatus by means of the abutment member. As a result, the at least one fastening device can also assume a defined position relative to the cleaning apparatus counter to the tensile force.

Given a structurally simple implementation of the above-described embodiment, the abutment member of the at least one support section and/or the abutment member of the cleaning apparatus are in the form of abutment faces which bear against one another.

The at least one support section is advantageously plate-shaped. In this case, the surfaces of said support section can form, in particular, abutment faces which form the abovementioned support member and the abovementioned abutment member.

It is advantageous when the cleaning apparatus has a receptacle for the at least one support section, in which receptacle said support section is at least partially disposed. This provides the option that the at least one support section and therefore the at least one fastening device assume a defined position in relation to the cleaning apparatus. The receptacle can have a wall which forms one or more abutment faces for one or more abutment faces of the at least one support section.

It is particularly preferred when the at least one support section is disposed in the receptacle in a positively-locking manner since, as a result, the at least one support section can assume a particularly well defined position in relation to the cleaning apparatus. In particular, the at least one support section can be supported against a wall of the receptacle and therefore against the cleaning apparatus.

The receptacle preferably has a rim which forms an edge along which the at least one connecting section runs, at least in certain sections and preferably entirely. This embodiment has proven advantageous, particularly in combination with the last-described embodiment, for ensuring that the at least one connecting section yields. On account of a positively-locking connection between the at least one support section and the receptacle, the tensile force can be effectively transmitted from the at least one fastening device to the cleaning apparatus, until the at least one connecting section is loaded to an excessive extent. An embodiment of this type is particularly advantageous when the at least one connecting section forms a predetermined breaking section and, in particular, a predetermined breaking line which then runs along the edge of the receptacle.

The at least one fastening device advantageously has at least one carrying section with a carrying member which interacts with a corresponding carrying member, which is disposed on the cleaning apparatus, for raising the cleaning apparatus by means of a lifting force which acts on the at least one fastening device. This allows the at least one fastening device to be used not only to fasten the cleaning apparatus to the carrier but also to raise the cleaning apparatus. To this end, a lifting force, which is transmitted to the cleaning apparatus by means of the interacting carrying members, can act on the at least one fastening device.

A structurally simple refinement of the cleaning apparatus and the at least one fastening device and also effective force transmission can be achieved by the carrying member of the at least one fastening device and/or the carrying member of the cleaning apparatus being in the form of abutment faces which bear against one another.

The at least one fastening device can be designed in an even simpler structural manner when the carrying member of the at least one fastening device is disposed on an upper face of said fastening device in relation to the arrangement of said fastening device on the cleaning apparatus.

It is advantageous when the at least one fastening device and the cleaning apparatus between them define a push-through region for a tensioning element which acts on the at least one tensioning section. By virtue of this arrangement of the at least one fastening device on the cleaning apparatus, a fastening lug is defined, for example, it being possible for the tensioning element to pass through or engage in said fastening lug.

In an advantageous embodiment, the at least one fastening device is in the form of a clip with a first end and with a second end, with the at least one tensioning section being disposed between the first end and the second end of the clip. Moreover, the above-described push-through region can be defined in a simple manner by means of a clip which is fastened to the cleaning apparatus.

In this case, the first end and the second end of the clip preferably each form a retaining section of the at least one fastening device for retaining said fastening device on the cleaning apparatus. The retaining sections are advantageously formed in the manner of the above-described at least one retaining section.

It has proven advantageous when in each case a carrying section for raising the cleaning apparatus by means of a lifting force which acts on the at least one fastening device is disposed between the at least one tensioning section and the ends of the clip. The two carrying sections are preferably formed in the manner of the above-described at least one carrying section.

Furthermore, in order to achieve a simple design, it has proven advantageous when the clip is substantially U-shaped, and when the at least one support section is disposed on the inside of the clip. In this case, said clip is preferably at a smaller spacing from the at least one tensioning section than from the ends of the clip.

The at least one support section is advantageously fixed by means of the at least one connecting section along an inside rim line or an inner rim face of the clip. In the process, said support section advantageously forms a, for example groove-like, material recess for defining a predetermined breaking section.

The at least one fastening device is preferably integrally formed since this reduces the costs of production of said fastening device.

Provision may be made for the at least one fastening device to be produced using at least one plastics material. In particular, said fastening device can be produced entirely from plastics material.

Provision may likewise be made for the at least one fastening device to be produced using at least one metal, it also being possible for said fastening device to be produced entirely from metal.

The following description of a preferred embodiment of the invention serves, in conjunction with the drawing, to explain the invention in greater detail.

DETAILED DESCRIPTION OF THE INVENTION

Figure 1:
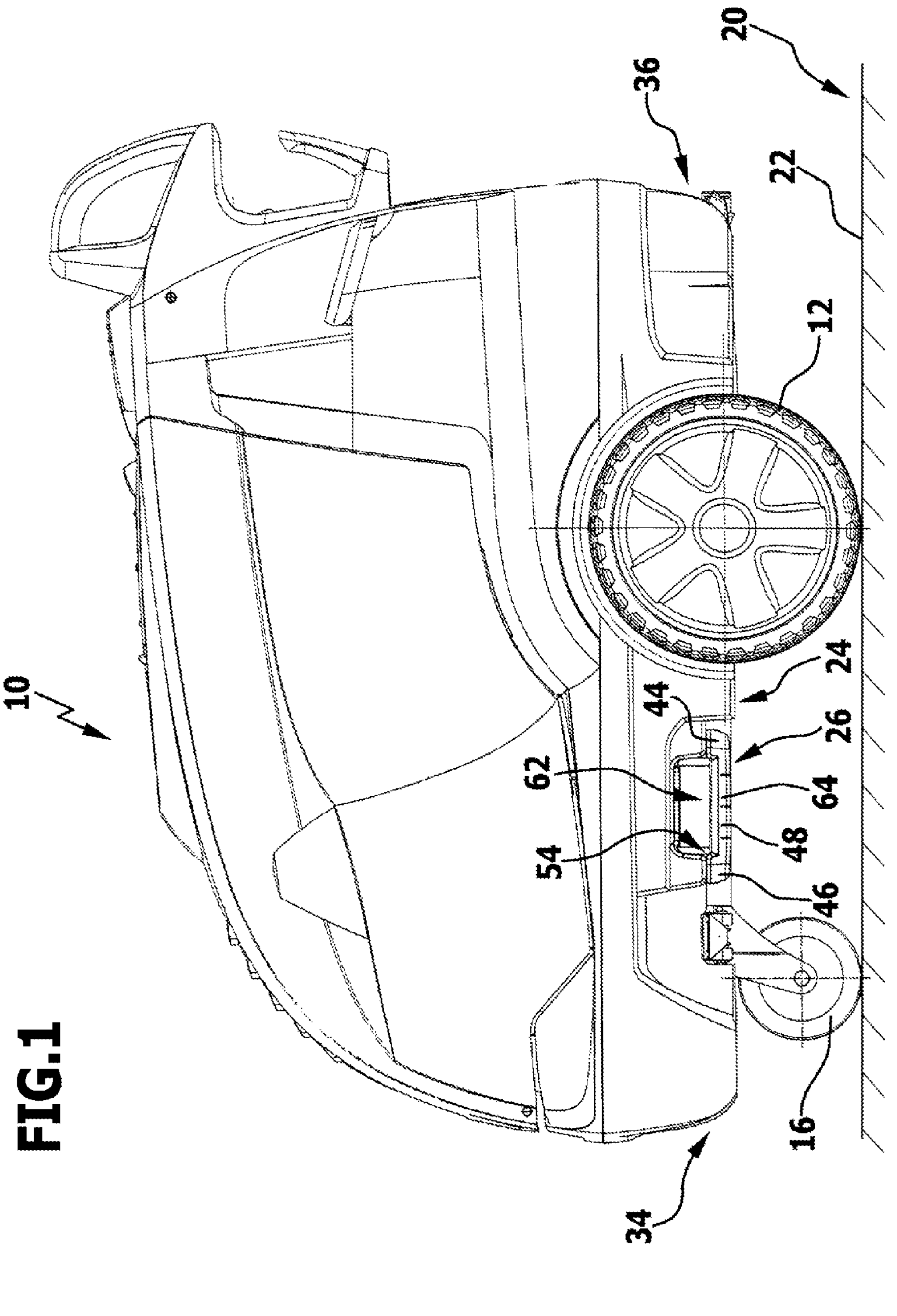
FIG. 1: shows a side view of a cleaning apparatus according to the invention.
Figure 2:
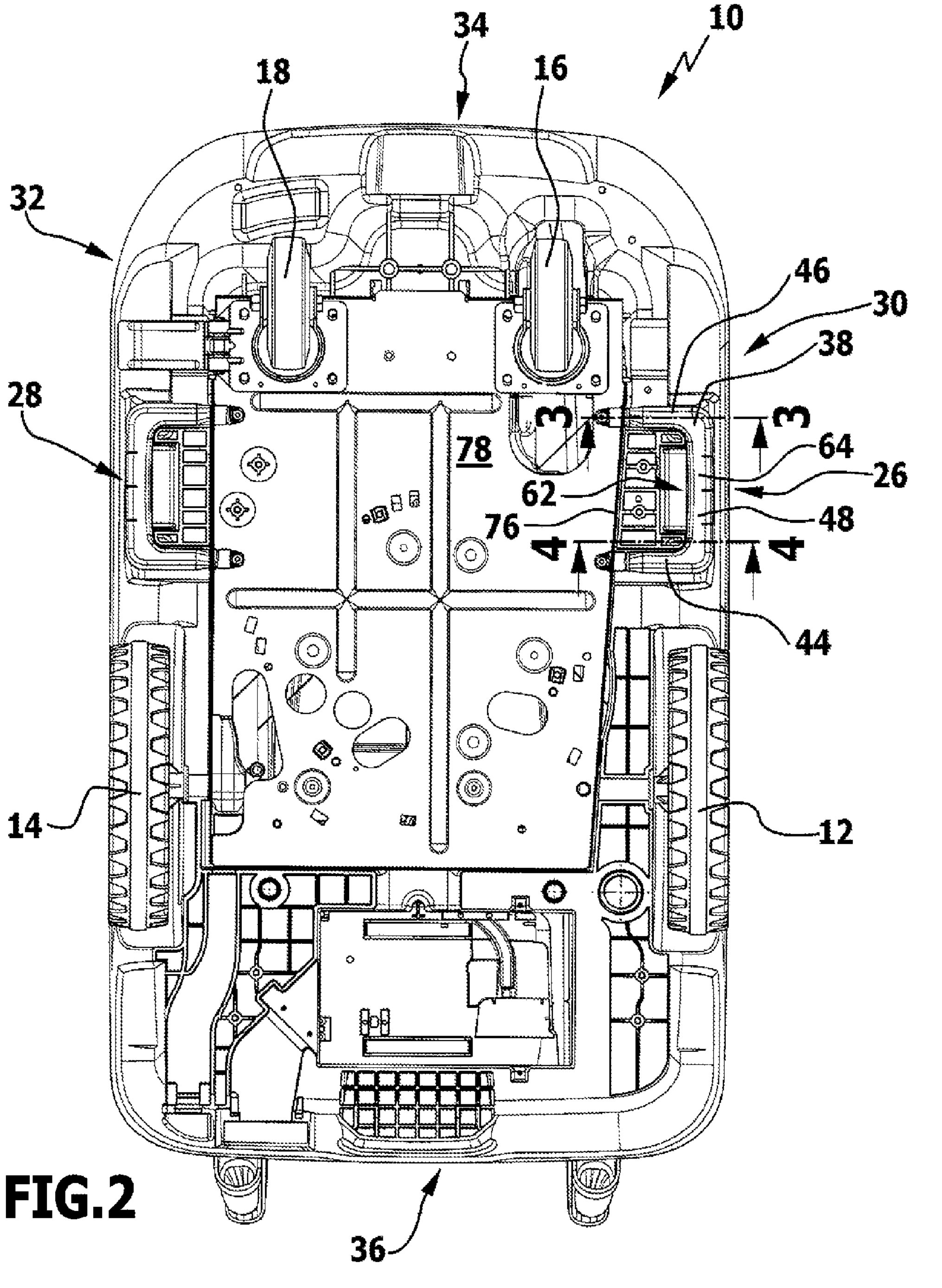
FIG. 2: shows a view of the cleaning apparatus from FIG. 1 from below.

A preferred embodiment of a cleaning apparatus according to the invention is illustrated in a side view from the left in FIG. 1 and in a view from below in FIG. 2 and is designated with reference symbol 10 in each of said figures. The cleaning apparatus 10 is in the form of a mobile high-pressure cleaning apparatus and rests by means of running wheels 12 and 14 and casters 16 and 18 on a carrier 20 in the form of a platform 22 which is schematically illustrated in FIG. 1. The platform 22 is, in this case, the loading area of a motor vehicle which is intended to transport the cleaning apparatus 10.

In order to fasten the cleaning apparatus 10 on the platform 22 during transportation, the cleaning apparatus 10 has, on its lower face 24, two fastening devices 26 and 28, of which fastening device 26 is disposed on the left-hand side 30 and fastening device 28 is disposed on the right-hand side 32 of the cleaning apparatus 10. The fastening devices 26 and 28 are each at a spacing from the front face 34 of the cleaning apparatus 10 which amounts to approximately one third of the spacing of the front face 34 from the rear face 36 of the cleaning apparatus 10. Furthermore, the fastening devices 26 and 28 are disposed approximately between the running wheel 12 and the caster 16 and, respectively, the running wheel 14 and the caster 18.

For the purpose of connection to the cleaning apparatus 10, the platform 22 has anchoring elements, which are known per se and are not shown in the drawing, for example in the form of lashing lugs, on which tensioning elements, which are known per se and are therefore not illustrated in the drawing, can act. The tensioning elements can act on the fastening devices 26 and 28 in the manner described below, in order to transmit a tensile force to the cleaning apparatus 10. The tensioning elements can be designed, for example, as tensioning belts or tensioning chains.

The fastening devices 26 and 28 are identical, and for this reason only the fastening device 26 will be explained in greater detail with reference to FIGS. 3 to 7 in the text which follows. The way in which the fastening devices 26 and 28 are fastened to the cleaning apparatus 10 is also identical, so that the way in which said fastening devices are fastened is explained by only using the example of fastening device 26 in the text which follows.

The fastening device 26 is designed in the form of a U-shaped clip 38. In the present case, the clip 38 is integrally produced from a plastics material, however provision may also be made for the clip 38 to be produced only partially from plastic, for said clip to be produced partially from metal, or for said clip to be produced integrally from a metal.

The clip 38 has an upper face 40 which faces the lower face 24 of the cleaning apparatus 10, and a lower face 42 which is averted from the lower face 24 of the cleaning apparatus 10. The clip 38 also comprises a first limb 44 and a second limb 46, which limbs are situated opposite one another and are connected to one another by means of a central section 48 of the clip 38.

Figure 5:
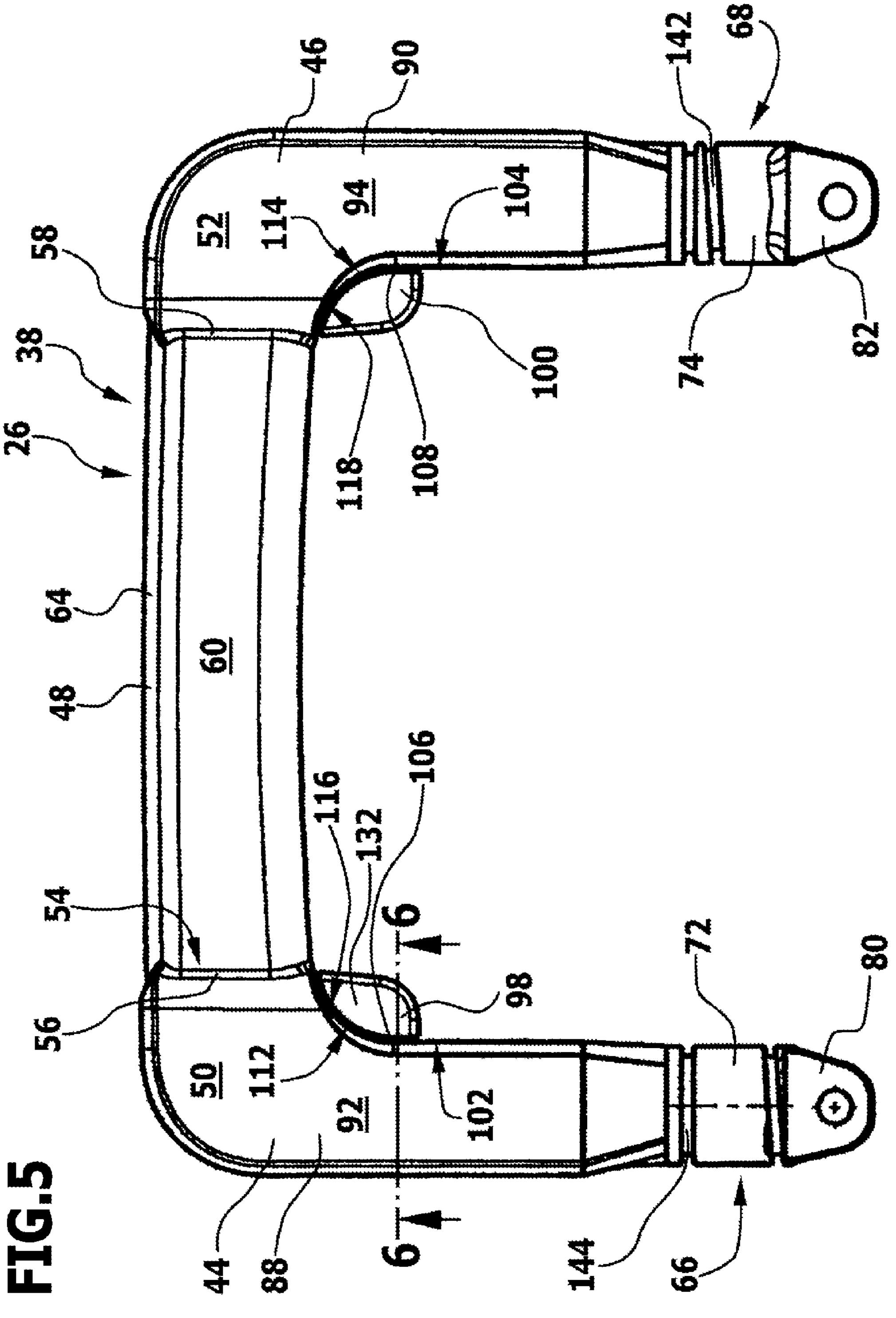
FIG. 5: shows a plan view of a fastening device of the cleaning apparatus from FIG. 1.
Figure 6:
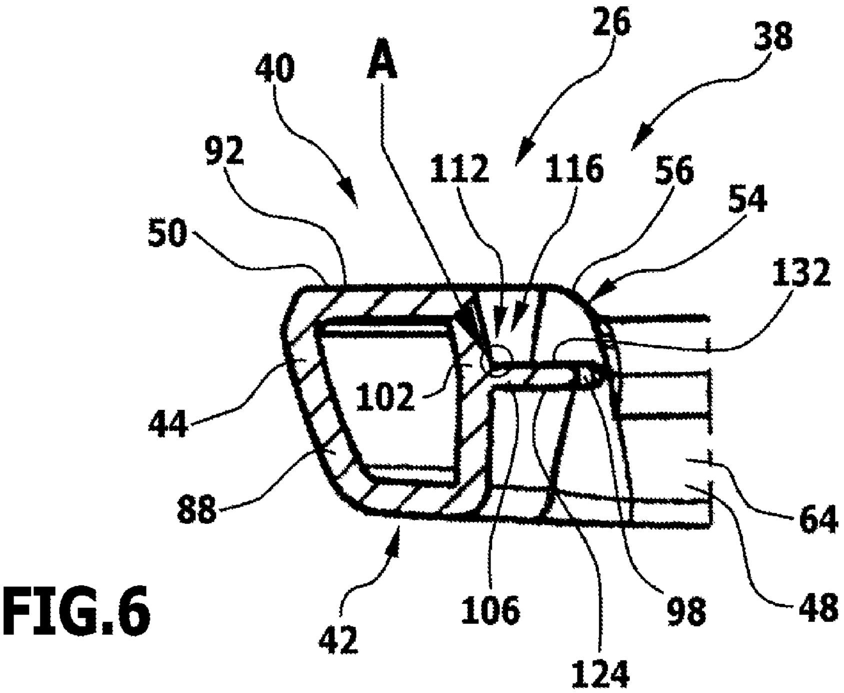
FIG. 6: shows a sectional view along line 6-6 in FIG. 5.

On the upper face 40, the first limb 44 and the second limb 46 have flat surfaces 50 and, respectively, 52, these surfaces defining a common plane. In relation to this plane, the central section 48 is provided with a recess 54 along its extent, said recess being bounded in the direction of the limbs 44 and 46 by wall sections 56 and, respectively, 58 by means of which a curved surface 60 of the central section 48 merges with the surfaces 50 and 52 of the limbs 44 and, respectively, 46 (FIGS. 5 and 6).

During fastening of the cleaning apparatus 10 to the platform 22, the wall sections 56 and 58 serve as a guide for the tensioning element, preferably a tensioning belt which is placed over the central section 48, which is used in the process, so that said tensioning element comes into contact with the surface 60 of said central section. To this end, the tensioning element is to be passed through a push-through region 62 which is formed between the clip 38 and the cleaning apparatus 10 (FIGS. 1 and 2), so that the clip 38 and the sections of the cleaning apparatus 10 which bound the push-through region 62 form a fastening lug for the tensioning element. If a force which is directed toward the platform 22 acts on the tensioning element, this force can be transmitted to the clip 38 by said tensioning element bearing against the central section 48, for which reason the central section 48 is called the tensioning section 64 of the clip 38.

Figure 3:
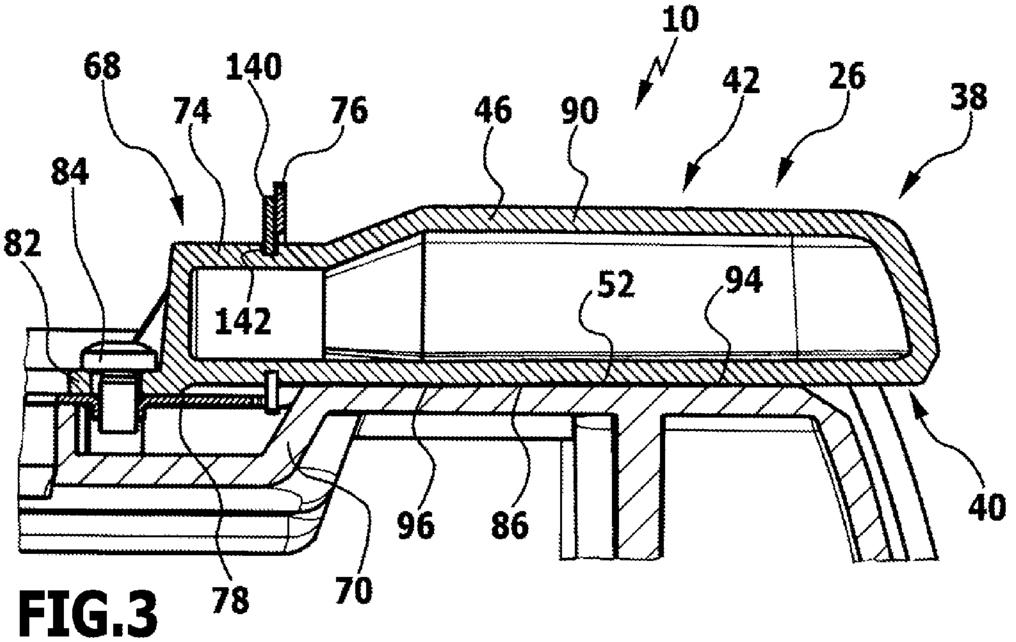
FIG. 3: shows a sectional view along line 3-3 in FIG. 2.
Figure 4:
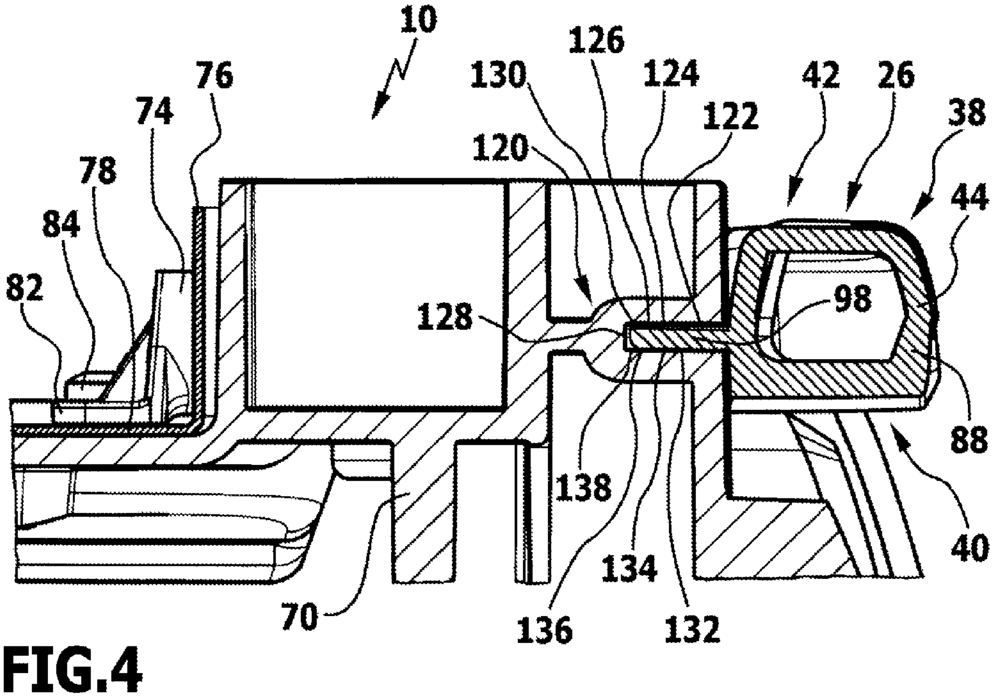
FIG. 4: shows a sectional view along line 4-4 in FIG. 2.

A first retaining section 66 and, respectively, a second retaining section 68 of the clip 38 adjoin the ends of the first limb 44 and of the second limb 46, said ends each being averted from the tensioning section 64. These retaining sections serve to retain the clip 38 on a carrier part 70 of the cleaning apparatus 10 (FIGS. 3 and 4).

The retaining sections 66 and 68 each comprise an annular segment 72 and, respectively, 74 which are adjoined by abutment flanges 80 and, respectively, 82 which form the outer ends of the clip 38. The abutment flanges 80 and 82 bear against a base plate 78 which is fixed to the lower face 24 of the cleaning apparatus 10. Connecting elements which engage with the carrier part 70 pass through the abutment flanges and the base plate 78 in order to fasten the clip 38 to the carrier part 70.

In the present case, the connecting elements are in the form of screws, of which only one screw 84 can be seen in the drawing. However, the connecting elements can also be rivets, clamps or the like. Cohesive connecting elements, for example weld seams, which can be used, for example, in a fastening device which is produced from metal, are also possible.

The base plate 78 is, for example, in the form of a metal sheet. Said base plate comprises an angled rim 76 through which the annular segments 72 and 74 pass.

A tensile force which acts on the tensioning section 64 can be transmitted to the cleaning apparatus 10 by the clip 38 being fastened to said cleaning apparatus by means of the retaining sections 66 and 68.

As already mentioned, the surfaces 50 and 52 of the limbs 44 and, respectively, 46 are flat. As illustrated in FIG. 3 using the example of the surface 52 of the limb 46, said surfaces can interact with corresponding surfaces of the carrier part 70. In FIG. 3, the surface of the carrier part 70 which corresponds to the surface 52 is provided with reference symbol 86. The surface 86 and the surface, which is not shown, of the carrier part 70, which surface bears against the surface 50 of the limb 44, are in each case flat, so that the carrier part 70 can bear flush against the clip 38.

If a lifting force which is directed away from the platform 22 acts on the clip 38, for example after the cleaning apparatus 10 has been unfastened from the platform 22, this lifting force can be transmitted from the clip 38 to the cleaning apparatus 10. The surfaces 52 and 86 and 50 and the corresponding surface of the carrier part 70, which surfaces bear flush one against the other, permit good force transmission from the clip 38 to the cleaning apparatus 10 in this case.

Since the cleaning apparatus 10 can be raised from the platform 22 in this way, the limbs 44 and 46 are also called carrying sections 88 and, respectively, 90, and the surfaces 50, 52 and 86 are called carrying members 92, 94 and, respectively, 96. The same applies to the surface, which is not shown, of the carrier part 70, which surface interacts with the surface 50.

Figure 7:
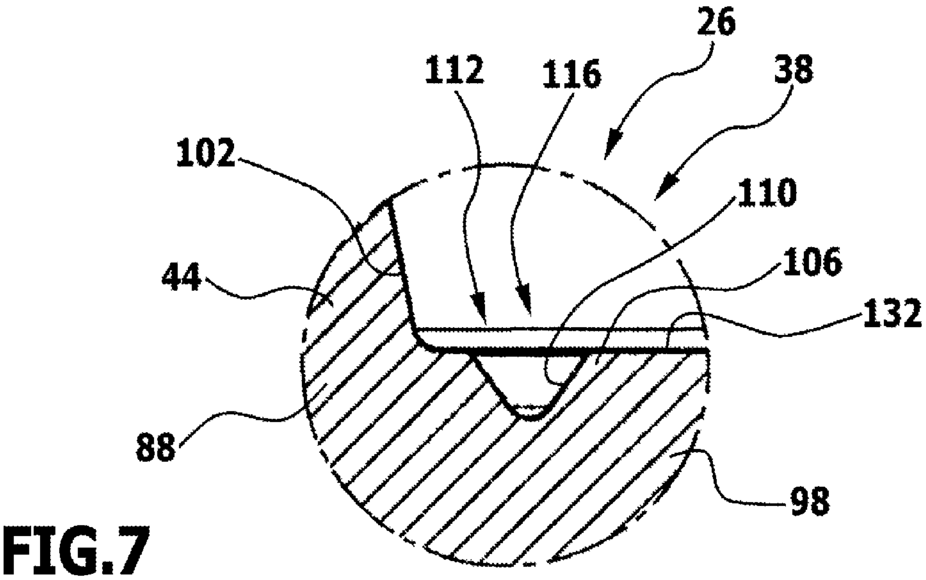
FIG. 7: shows an enlarged illustration of detail A in FIG. 6.

On the inside, that is to say in a manner enclosed by the limbs 44 and 46 and by the tensioning section 64, the clip 38 has two plate-like support sections 98 and 100 which are connected to inside walls 102 and, respectively, 104 of the limbs 44 and, respectively, 46 close to the connecting regions of the limbs 44 and 46 and the tensioning section 64 (FIGS. 5 to 7). In this case, the connection runs along rims 106 and 108 of the support sections 98 and, respectively, 100, so that connecting sections 112 and, respectively, 114 are defined between the walls 102 and 104 and the support sections 98 and, respectively, 100. The tensioning section 64 is connected indirectly to the support sections 98 and 100 by means of the limbs 44 and 46 and the connecting sections 112 and 114.

The plane which is defined by the support sections 98 and 100 runs parallel to the plane which is defined by the surfaces 50 and 52, and, in a view of the clip 38 from above and in a view of the clip 38 from below, the support sections 98 and 100 are of approximately lens- or drop-shaped design.

Along the rims 106 and, respectively, 108, the connecting sections 112 and 114 each have a groove-like material recess, of which only one material recess 110 of the connecting section 112 can be seen in the detailed illustration of FIG. 7. Said material recess runs along the rim 106 of the support section 98. The connecting section 112 therefore forms a predetermined breaking section 116 of the clip 38. In the same way, the connecting section 114 forms a predetermined breaking section 118 of the clip 38. The way in which the predetermined breaking sections 116 and 118 function will be explained further below.

As shown in FIG. 4, the carrier part 70 has a receptacle 120 for the support section 98, this support section being disposed in said receptacle in a positively-locking manner. The carrier part has a further receptacle for the support section 100, which further receptacle, however, is not shown in the drawing. This support section is likewise positively-locking disposed in the receptacle which is associated with it. The statements made about the arrangement of the support section 98 in the receptacle 120 can be correspondingly applied to the support section 100 and the receptacle associated with it.

In order to be disposed in the receptacle 120, the support section 98 comprises a support number 122, which is formed by its surface 124, on the tensile force side, that is to say in the direction of the tensile force which is directed toward the platform 22. By means of the surface 124, the support section 98 bears against a corresponding surface 126 of a wall 128 of the receptacle 120, so that the surface 126 forms a support member 130 of the receptacle 120.

Counter to the tensile force, that is to say in a direction facing away from the platform 22, a surface 132 of the support section 98 forms an abutment member 134. By means of the surface 132, the support section 98 bears against a surface 136 of the wall 128 of the receptacle 120, so that the surface 136 likewise forms an abutment member 138 of the receptacle 120. In this way, the support section 98 is positively-locking disposed in the receptacle 120 between the support member 130 and the abutment member 138 of said receptacle.

When a tensile force which is imparted by a tensioning element acts on the tensioning section 64 in the direction of the platform 22, the clip 38 is supported on the carrier part 70 by means of the support section and the support section 100. In the case of the support section 98, this is performed by supporting its support member 122 on the support member 130 of the receptacle 120. In this way, the tensile force acting on the clip 38 can be transmitted to the carrier part for fastening the cleaning apparatus 10 on the platform 22.

On account of the support section 98 and the support section 100 being disposed in a positively-locking manner in the receptacle 120 and, respectively, in the receptacle which is not shown, and on account of the spacing of the support sections 98 and 100 from the tensioning section 64 being smaller than the spacing of the retaining sections 66 and 68 from the tensioning section 64, the tensile force is transmitted to the carrier part 70 by means of the support sections 98 and 100 when the clip 38 is intact.

As the tensile force on the tensioning section 64 increases, the support sections 98 and 100 are subjected to an increasingly greater load since the carrier part 70 of the cleaning apparatus 10 is rigid and thus can apply the required counterforce at any time. When the tensile force exceeds a maximum permissible tensile force, this leads to the clip 38 on the connecting sections 112 and 114 yielding since these sections can transmit only a maximum permissible tensile force from the tensioning section 64, by means of the limbs 44 and 46, to the support sections 98 and, respectively, 100, on account of the material recess 110 and the material recess which is not shown.

As already mentioned, the connecting sections 112 and 114 are formed such that they form predetermined breaking sections 116 and 118, so that the support sections 98 and 100 break off from the limbs 44 and 46 when the tensile force on the tensioning section 64 exceeds the maximum permissible tensile force.

This is advantageous in order to prevent excessive tensile forces, for which the cleaning apparatus 10 is not designed and which could lead to undesired damage to the cleaning apparatus 10, being transmitted to the cleaning apparatus 10. Excessive tensile forces could occur, for example, during transportation of the cleaning apparatus 10 on a motor vehicle when the motor vehicle is subjected to sudden severe acceleration or deceleration.

On account of forming the connecting sections 112 and 114 as predetermined breaking sections 116 and 118, it is also possible to establish, following transportation of the cleaning apparatus 10, whether the cleaning apparatus 10 was exposed to excessive vibrations during transportation.

The connection between the clip 38 and the carrier part 70 by means of the retaining sections 66 and 68 and the associated connecting elements is formed such that it is possible to ensure the connection even when the tensile force which acts on the tensioning section 64 exceeds the maximum permissible tensile force which leads to malfunctioning of the connecting sections 112 and 114. In this way, the cleaning apparatus 10 is reliably fastened to the platform 22 even when the connecting sections 112 and 114 have yielded, so that the cleaning apparatus 10 does not stand on the platform 22 in an unsecured manner.

To reduce the risk of the cleaning apparatus 10 being damaged on account of an excessive tensile force, which is exerted on the carrier part 70 by means of the retaining sections 66 and 68, in such a case, the retaining sections 66 and 68 can be somewhat deformable in their regions which face the limbs 44 and, respectively, 46. In the cleaning apparatus 10 however, the retaining sections 66 and 68 are rigid. Instead, the rim 76 of the base plate 78 is deformable and can be bent by an excessive tensile force.

In this way, in both the cases mentioned above, the limbs 44 and 46 can be moved somewhat away from the carrier part 70 in the event of excessive vibration of the platform 22, and nevertheless the cleaning apparatus 10 can continue to be fastened to the platform 22 by means of the clip 38.

In order to ensure that the cleaning apparatus 10 can also be securely fastened when the cleaning apparatus 10 is lashed, in which case a tensile force acts on the tensioning section 64 in the horizontal direction, that is to say parallel to the platform 22, the retaining sections 66 and 68 are additionally secured to the rim 76 of the base plate 78 by means of securing elements. The securing elements are in the form of securing disks, of which only one securing disk 140 is shown in the drawing (FIG. 3). This securing disk engages in an annular groove 142 of the annular segment 74 and engages with the base plate 78. A corresponding annular groove 144 is disposed on the annular segment 72 in which the securing disk, which is not illustrated, engages (FIG. 5).

The invention claimed is:

1. Cleaning apparatus, in particular high-pressure cleaning apparatus, comprising:

at least one fastening device for fastening the cleaning apparatus to a carrier, the at least one fastening device being in the form of a clip and comprising:

a first end and a second end;

at least one tensioning section, disposed between the first and second ends, on which a tensile force, which tensile force is directed at the carrier, acts when the cleaning apparatus is fastened to the carrier by means of a tensioning element, at least one retaining section, which is connected to the at least one tensioning section, for retaining the at least one fastening device on the cleaning apparatus, at least one support section for supporting the fastening device on the cleaning apparatus, said support section being connected to the at least one tensioning section by means of at least one connecting section, the at least one connecting section yielding if the tensile force exceeds a maximum permissible tensile force, wherein:

the first end and the second end of the clip each form a respective one of said at least one retaining section of the at least one fastening device for retaining said fastening device on the cleaning apparatus, the clip further comprises a first limb and a second limb, the first limb and the second limb connecting the at least one tensioning section with the retaining sections, and the at least one support section is connected to one of the limbs via the at least one connecting section.

2. Cleaning apparatus according to claim 1, wherein the at least one retaining section ensures that the at least one fastening device is retained on the cleaning apparatus when the tensile force exceeds the maximum permissible tensile force.

3. Cleaning apparatus according to claim 1, wherein:

the at least one retaining section is disposed on a side of the at least one fastening device which is averted from the at least one tensioning section, and the at least one connecting section and the at least one support section are at a smaller spacing from the at least one tensioning section than the at least one retaining section.

4. Cleaning apparatus according to claim 1, wherein the at least one retaining section is deformable, at least in certain regions.

5. Cleaning apparatus according to claim 1, wherein the at least one connecting section forms a predetermined breaking section.

6. Cleaning apparatus according to claim 1, wherein the at least one connecting section forms a deformation section.

7. Cleaning apparatus according to claim 1, wherein the at least one connecting section is formed, at least in certain regions, using a material which can be deformed by means of a lesser force than a material which is used to form the at least one tensioning section and/or the at least one support section.

8. Cleaning apparatus according to claim 1, wherein the at least one connecting section forms a material recess, at least in certain regions.

9. Cleaning apparatus according to claim 8, wherein the material recess is in the form of at least one of a groove and a perforation.

10. Cleaning apparatus according to claim 1, wherein the at least one connecting section is disposed on a rim of the at least one support section, the at least one support section being connected to a remainder of the at least one fastening device by means of said rim.

11. Cleaning apparatus according to claim 1, wherein the at least one support section has a support member, which interacts with a corresponding support member of the cleaning apparatus on a tensile force side, in order to transmit the tensile force from the at least one fastening device to the cleaning apparatus.

12. Cleaning apparatus according to claim 11, wherein the support member of the at least one support section and/or the support member of the cleaning apparatus are in the form of abutment faces which bear against one another.

13. Cleaning apparatus according to claim 1, wherein the at least one support section has an abutment member which interacts with a corresponding abutment member of the cleaning apparatus counter to the tensile force.

14. Cleaning apparatus according to claim 13, wherein the abutment member of the at least one support section and/or the abutment member of the cleaning apparatus are in the form of abutment faces which bear against one another.

15. Cleaning apparatus according to claim 1, further comprising a receptacle for the at least one support section, in which receptacle said support section is at least partially disposed.

16. Cleaning apparatus according to claim 15, wherein the at least one support section is disposed in the receptacle in a positively-locking manner.

17. Cleaning apparatus according to claim 15, wherein the receptacle has a rim which forms an edge along which the at least one connecting section runs, at least in certain sections.

18. Cleaning apparatus according to claim 1, wherein the at least one fastening device has at least one carrying section with a carrying member which interacts with a corresponding carrying member, which is disposed on the cleaning apparatus, for raising the cleaning apparatus by means of a lifting force which acts on the at least one fastening device.

19. Cleaning apparatus according to claim 18, wherein the carrying member of the at least one fastening device and/or the carrying member of the cleaning apparatus are in the form of abutment faces which bear against one another.

20. Cleaning apparatus according to claim 18, wherein the carrying member of the at least one fastening device is disposed on an upper face of said fastening device in relation to an arrangement of said fastening device on the cleaning apparatus.

21. Cleaning apparatus according to claim 1, wherein the at least one fastening device and the cleaning apparatus between them define a push-through region for a tensioning element which acts on the at least one tensioning section.

22. Cleaning apparatus according to claim 1, wherein in each case a carrying section for raising the cleaning apparatus by means of a lifting force which acts on the at least one fastening device is disposed between the at least one tensioning section and the ends of the clip.

23. Cleaning apparatus according to claim 1, wherein the clip is substantially U-shaped, and wherein the at least one support section is disposed on an inside of the clip.

24. Cleaning apparatus according to claim 23, wherein the at least one support section is fixed by means of the at least one connecting section along an inside rim line or an inner rim face of the clip.

25. Cleaning apparatus according to claim 1, wherein the at least one fastening device is integrally formed.

26. Cleaning apparatus according to claim 1, wherein the at least one fastening device is produced using at least one plastics material.

27. Cleaning apparatus according to claim 1, wherein the at least one fastening device is produced using at least one metal.

28. Cleaning apparatus according to claim 1, wherein:

the at least one support section comprises two support sections, the at least one connecting section comprises two connecting sections, and the support sections are connected to the first limb and the second limb, respectively, via a respective one of the connecting sections.

29. Cleaning apparatus, in particular high-pressure cleaning apparatus, comprising:

at least one fastening device for fastening the cleaning apparatus to a carrier, the at least one fastening device comprising:

at least one tensioning section on which a tensile force, which is directed at the carrier, acts when the cleaning apparatus is fastened to the carrier by means of a tensioning element, at least one retaining section, which is connected to the at least one tensioning section, for retaining the at least one fastening device on the cleaning apparatus, at least one support section for supporting the fastening device on the cleaning apparatus, said support section being connected to the at least one tensioning section by means of at least one connecting section, the at least one connecting section yielding if the tensile force exceeds a maximum permissible tensile force, wherein:

the at least one fastening device is in the form of a clip with a first end and with a second end, with the at least one tensioning section being disposed between the first end and the second end of the clip; and the clip is substantially U-shaped, and wherein the at least one support section is disposed on an inside of the clip.

30. Cleaning apparatus according to claim 29, wherein the first end and the second end of the clip each form a retaining section of the at lease fastening device for retaining said fastening device on the cleaning apparatus.

* * * * *